Oct. 11, 1949.  N. C. FOSTER  2,484,215
SYNTHETIC RESIN COMPOSITIONS
Filed Aug. 30, 1946
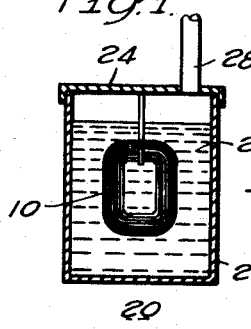
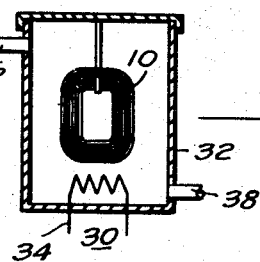
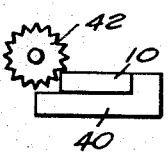
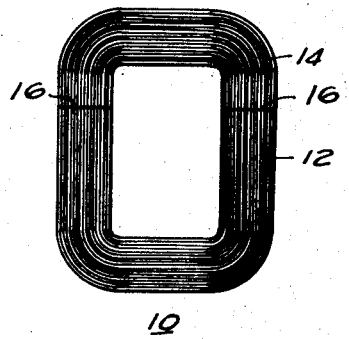
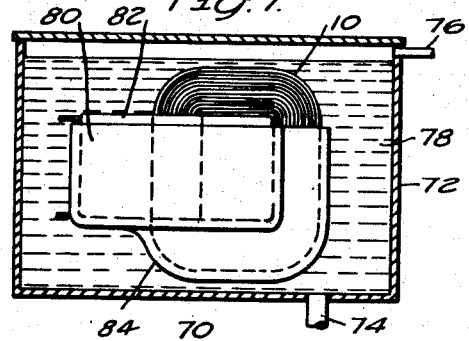
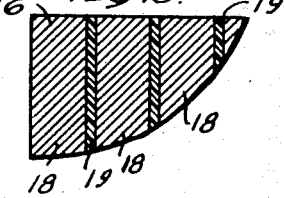
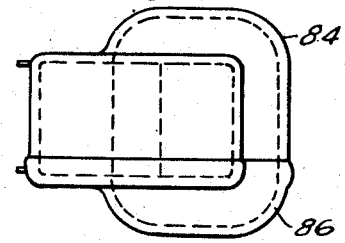
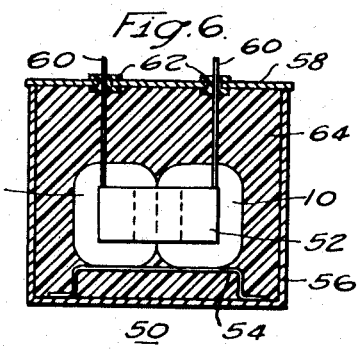
WITNESSES:
INVENTOR
Newton C. Foster.
BY
Frederick Shapoe
ATTORNEY

UNITED STATES PATENT OFFICE 2,484,215

SYNTHETIC RESIN COMPOSITIONS

Newton C. Foster, Pittsburgh, Pa., assignor to Westinghouse Electric Corporation, East Pittsburgh, Pa., a corporation of Pennsylvania Application August 30, 1946, Serial No. 694,127

13 Claims. (Cl. 260—22)

This invention relates to synthetic resin compositions, more particularly thermosetting type resin compositions characterized by good electrical insulating properties. The resin compositions are further characterized by the fact that they may be applied as impregnating solutions without the use of a solvent which requires evaporation or removal prior to polymerization.

This application is a continuation-in-part of my copending patent application Serial No. 418,153, filed November 7, 1941, entitled Synthetic resin compositions, and assigned to the Westinghouse Electric Corporation, now abandoned.

In the art of applying resinous compositions to members for the purpose of impregnating or coating the members, it has been customary to dissolve the resinous composition in some readily volatile solvent for the purpose of enabling the application of the resinous composition to the members. As a general rule, the solvents have been low boiling point liquids incapable of entering into reaction with the resin. Consequently, evaporation or removal of the solvent by some means has been practiced. In many cases, the evaporation of the solvent is attended by a deterioration of the physical characteristics of the resin deposited from solution. Gas bubbles, porous pockets, non-uniform filling or incomplete impregnation and other undesirable results have occurred due to the presence of and the evaporation of the solvent.

In a few cases, it is known to employ reacting solvents for resins, these solvents being so characterized by the fact that they enter into a polymerizing reaction after impregnation of members with the resin solutions. The reacting solvents for the most part have been employed in dissolving a polymer in a solvent composed mainly of the monomer itself. For example, polystyrene has been applied in solutions with monostyrene as the solvent. Upon the application of a catalyst and heat, the monostyrene was polymerized into polystyrene to produce a resinification of the entire solution. In nearly all known cases, these completely polymerizable solutions produced only thermoplastic resins.

In the preparation of these so-called "solventless" or solvent reactive resin compositions, it has not been generally possible to produce thermoset polymers in spite of the fact that this would be highly desirable in many instances. More uniform fill upon impregnation, a more homogenous and impervious product are some of the advantages to be obtained by employing solutions of resins in which the solvent is subject to a polymerizing reaction. Other advantages accrue from the fact that no evaporable solvent is employed, thereby enabling a saving of time and equipment required for drying purposes.

The object of this invention is to provide a thermosettable liquid solvent reactive resin composition suitable for use in impregnating members.

Another object of the invention is to provide for bonding and insulating electrical and other members by means of a thermoset resinous composition applied thereto as a solution in which the solvent reacts to form a part of the thermoset composition.

Another object of the invention is to provide for a thermosetting resin composition having no solvent requiring evaporation suitable for application to electrical apparatus to be employed in dielectric liquids.

A further object of the invention is to impregnate solidly magnetic cores and other electrical apparatus with a thermoset solvent reactive resin composition.

Other objects of the invention will in part appear hereinafter.

For a fuller understanding of the nature and objects of the invention, reference may be had to the following detailed description, taken in conjunction with the accompanying drawing, in which:

Figure 1 is a view in elevation, partly in section;

Fig. 2 is a view in elevation, partly in section;

Fig. 3 is a view in elevation;

Fig. 4 is a plan view of the wound core;

Fig. 5 is a greatly enlarged fragmentary cross-sectional view of a face of the core of Fig. 4;

Fig. 6 is a view in elevation, partly in cross-section, of a transformer;

Fig. 7 is a view in elevation, partly in section; and

Fig. 8 is a view in elevation of an encapsulated transformer.

According to this invention, a thermosetting synthetic resin composition is prepared by combining a resinous reaction product in a reacting solvent which is capable of polymerizing in conjunction with the reaction product to produce a solid thermoset material. The solution prepared by dissolving the reaction product in the reacting solvent is known as a solvent reactive or "solventless" varnish or resin solution. This basic resin solution may be modified with other resinous reaction products capable of polymerizing conjointly therewith in order to impart predetermined toughness, solvent resistance and other desirable characteristics.

More specifically, for the practice of this invention, an unsaturated acid half ester is produced by reacting (a) an olefinic alpha-beta dicarboxylic acid or anhydride thereof and (b) either castor oil or an ester of ricinoleic acid with a polyhydric alcohol and 100 parts by weight of the unsaturated acid half ester so produced is dissolved in from 10 to 186 parts by weight of a liquid polymerizable monomer having the group $H_2C=C<$ to produce a solution that can be substantially completely copolymerized to a thermoset body.

The unsaturated acid half ester can be prepared most conveniently from castor oil, which is essentially glyceryl triricinoleate. However the half ester may be prepared from simple substituted castor oil or related esters such, for example, as di-ricinoleic acid ester of ethylene glycol, tetraricinoleic acid ester of pentaerythritol, glyceryl monoricinoleate and glyceryl diricinoleate. Mixtures of two or more of these esters may be employed.

Examples of suitable olefinic alpha, beta dicarboxylic acids and their anhydrides for reaction with the castor oil or related esters are maleic acid, maleic anhydride, fumaric acid, citraconic anhydride and monochlor maleic anhydride.

In preparing the acid half ester, sufficient olefinic alpha, beta dicarboxylic acid or anhydride thereof is reacted with the castor oil or ricinoleic acid ester to esterify, on the average, in each molecule at least one of the hydroxyl groups present in the ricinoleic radicals. In some cases, two or more, or all, of the hydroxyl groups, as the case may be, of the castor oil or other ricinoleic acid ester may be esterified with the olefinic dicarboxylic acid thereby producing full acid half esters. It may be desirable in some cases to employ a moderate excess of castor oil in order to provide for plasticizing the final product. Using 100 parts by weight of castor oil, from 3 to 30 parts by weight of maleic anhydride may be reacted therewith. A slightly greater weight of maleic acid will be required to produce the same half ester due to difference in molecular weight as compared to maleic anhydride. Similar allowance in weights must be made for other olefinic acids and anhydrides. For many applications, two to four parts of castor oil to one part by weight of olefinic dibasic acid will give a suitable half ester.

In producing the half esters, castor oil, for example, admixed with maleic anhydride in the desired proportions, is heated to a temperature of about 70° C. or higher. A mixture of 100 parts by weight of castor oil and 30 parts by weight of maleic anhydride will be sufficiently reacted in four hours at 120° C. The acid number will be from 130 to 135, indicating the acid half ester has been produced. Temperatures of above 160° C. should not be applied for prolonged periods of time, otherwise the relatively undesirable full ester of the dibasic acid will be produced. Excessive reaction times at lower temperatures should be avoided to prevent the full ester being formed. The full or non-acidic ester will not copolymerize with the liquid monomer having the group $H_2C=C<$, but will only form a mixture of polymers and not a thermoset resin.

For producing the acid half ester, it has been most convenient to use the olefinic acid anhydrides, such for instance as maleic anhydride. The anhydrides form the acid half ester with ease by an addition reaction with the hydroxyl group. No water is split off and therefore the reaction is rapid as compared to that using the dibasic acid proper. The resulting carboxyl group in the maleate half ester is much less reactive than maleic anhydride and the tendency to form the full ester is weak as long as any unreacted maleic anhydride is present. The course of the reaction can be conveniently followed by taking the acid number of the reaction mixture from time to time. When the acid number has reached half the value found when the reactants were first admixed, the acid half ester reaction is substantially complete. The product is of a light syrupy consistency.

For use in dissolving and reacting with the half ester, suitable polymerizable liquid monomers having the group $H_2C=C<$ are monostyrene, distyrene, vinyl acetate, paramethyl styrene, methyl vinyl ketone, acrylonitrile, methyl methacrylate, ethyl acrylate and allyl esters, such as diallyl phthalate.

The solution may be applied to members after incorporation of a catalyst either in the resin or on the surface of the members being impregnated. Suitable catalysts are peroxides, such as benzoyl peroxide, ascaridole, lauryl peroxide and tertbutyl perbenzoate, and ozonides and the like. After impregnation of the members with the half ester-monomer solution, they may be subjected to heat in a range of temperatures of from 100° C. to 250° C. and gelling or polymerization will take place in two to three minutes, however longer heating is required to obtain complete curing. From ½ to 4 hours heat treatment is recommended, the shorter times being sufficient at the higher temperatures. It is believed the polymerizable monomer is cross-coupled by the half ester reaction product to produce a thermoset resinous copolymer. The thermoset copolymer has unusual moisture resistance and a high resistance to deterioration at elevated temperatures.

The following examples in which all parts are by weight illustrate the preparation of the compositions:

*Example I*

An acid half ester was prepared by reacting

| | Parts |
|---|---|
| Castor oil | 100 |
| Maleic anhydride | 30 |

(mol ratio of about 1:3) at 140° C. for two hours. The half ester was dissolved in 24.4 parts by weight of monostyrene, ½% of benzoyl peroxide added, and the solution completely polymerized by heating for one hour at 125° C. to a thermoset body. When tested at 25° C. with 60-cycle current, the power factor of the body was 3.08% and the specific inductive capacity was 4.83. Considering the fact that the resin is thermoset, these values indicate highly advantageous electrical properties.

*Example II*

Thirty-five parts of the castor oil maleate half ester of Example I was dissolved in sixty-five parts of monostyrene and the solution polymerized to a thermoset state by adding 1% benzoyl peroxide and heating for one hour at 150° C. The solid was of a light amber color and was transparent. Upon heating at a temperature of 125° C. for 28 weeks, the solid had decreased only 3.3% in weight. The color and transparency of the solid had not changed appreciably after the heat test and it was still flexible.

A cast piece of the resin having a cross-section of 0.500 inch by 0.125 inch had a tensile strength of 1690 pounds per square inch. A similar piece prepared from equal parts of monostyrene and castor oil maleate had a tensile strength of 2885 pounds per square inch.

Electrical tests of the solid indicated a power factor at 25° C. of 0.94% at 100 cycles, 0.96% at 1 kilocycle and 1.44% at 1 megacycle. At 125° C., the power factor was 0.81% at 100 cycles and 3.45% at 1 megacycle. The dielectric strength for a 56 mil thick sample was 526 volts per mil.

*Example III*

An acid half ester was prepared by reacting

| | Parts |
|---|---|
| Castor oil | 100 |
| Maleic anhydride | 8 |

(a mol ratio of about 5:4) as in Example I.

Fifty parts of the castor oil maleate were dissolved in fifty parts of monostyrene. Upon adding ½ part of benzoyl peroxide and heating to 120° C. for three hours, the solution completely reacted into a thermoset solid.

The power factor of the solid at 25° C. using 100 cycle current was 1.07%; while using 100 kilocycle current, the power factor was 1.96%. At 125° C., the power factor was 2.02% at 100 cycles and 0.516% at 100 kilocycles. The dielectric strength for a sample 130 mils thick was 415 volts per mil.

In order to prevent spontaneous polymerization and undue thickening of the solution of liquid monomer and half ester prior to use, it is desirable to incorporate a small amount of a polymerization inhibitor such as hydroquinone in the solution when it is being prepared. The addition of about 1/10 of 1% of hydroquinone has been satisfactory for this purpose. When the catalyst, such as a peroxide or ozonide, is subsequently added preceding application or use of the solution, sufficiently more should be added to compensate for the amount of inhibitor present.

The viscosity of the solution of liquid monomer and castor oil maleate may be readily varied within a wide range. The addition of finely divided inorganic solids such as mica, silica flour or talc provides one means of increasing the viscosity. Selection of one of various castor oil maleate half esters and variation in proportion of the liquid monomer therewith enable solutions to be produced almost as fluid as water. Addition of suitable fillers gives liquids as viscous as molasses or even putty-like in consistency. The range of viscosity secured with such variations has been from about 2 centipoises to 460,000 centipoises at 25° C.

A particularly desirable application for the liquid resin composition is in magnetic cores to provide both for a bonding and an insulating layer between the laminations. Transformer laminations of all shapes, and motor and generator magnetic laminations may be successfully bonded together into solid cores having unusual advantages. The cores may be cut or worked to shape and size after bonding without delamination. The bonding of a wound core of oriented silicon iron is believed the most demanding core application and a specific application relating thereto will be detailed.

Referring to Figure 1 of the drawing, there is illustrated a wound core 10, such as is produced by winding a continuous strip of oriented magnetic sheet material about a mandrel, being impregnated in the apparatus 20 with the composition of the present invention. The apparatus 20 comprises a tank 22 provided with a cover 24 in which the solution 26 composed of, for example, castor oil maleate half ester dissolved in a liquid polymerizable monomer containing the group $H_2C=C<$. A conduit 28 is provided for evacuating the container 22 if vacuum impregnation of the core 10 is required. The core 10 may be introduced into the container 22 and the atmosphere evacuated therefrom to remove gases, moisture and the like which would hinder the penetration of the composition 26 into the interstices and spaces of the core 10. Positive pressure may also be applied to force the resin into the core interstices.

After a brief immersion in the solution 26, the impregnated core 10 may be withdrawn from the apparatus 20 and placed within the oven 30 shown in Fig. 2 of the drawing. The oven 30 comprises walls 32 and a heating element 34 and means 36—38 for exhausting volatile products that may be produced during the curing of the resin composition applied to the core 10. Ordinarily, however, very little volatile matter is given off by the resinous compositions of this invention. The compositions of the invention gels rapidly after a temperature of about 120° C. has been reached. Thereafter, the heat treatment is continued in order to produce a predetermined degree of cure of the composition. One or two hours at 140° C. will produce a hard, but flexible, resin that is transparent if no solid fillers are present. An advantage of the resinous composition is that the curing time may be prolonged considerably without undesirable effects, such as cracking or deterioration thereof.

After heat treating for a predetermined period of time in the oven 30, the impregnated core 10 will be found to be solidly bonded. The core will have the interlaminar spaces completely and solidly filled with the thermoset resin. It will be free from flaws, such as pores, gas pockets, or the like, which are encountered in employing resin compositions using volatile solvents requiring evaporation. The laminations will be bonded much better than would result by the use of conventional resin solutions having evaporable solvents. Experience has shown that a wound core 10, such as is shown in the figures, cannot be substantially completely solidly impregnated and bonded, except by the use of a completely polymerizable resinous composition, such as disclosed herein.

For most applications, the wound core 10, after baking, must be cut in order to permit application of windings thereto. A suitable cutting mechanism is shown in Fig. 3, wherein the core 10 is mounted on a table 40, permitting relative motion to a cutting saw 42. The laminations will be found to be so well bonded that no unusual jigs or other clamping means are required to clamp the core 10 to the table 40. The cutter 42 may be a milling cutter, a saw, or an abrasive cutting wheel, or the like. If the cutter 42 produces relatively rough surfaces, the cut faces may be ground and etched in acid to reduce them to a smooth plane surface.

Referring to Fig. 4 of the drawing, there is illustrated in more detail, the wound core 10 produced after impregnation with resin and cutting. Two U-shaped sections 12 and 14 have been formed with substantially plane faces 16 providing for a small air gap. The laminations are so well united that they withstand all the machining operations required without delamination. The appearance of the faces 16 is shown in Fig. 5 of the drawing in a greatly enlarged illustration. The laminations 18 forming the core are bonded by the thermoset resin 19 of this invention present in the interlaminar spaces. The resin 19 will also function as an efficient insulating medium. A further advantage of the resin of this invention is that it bonds the laminations into units that possess more damping than cores bonded with conventional thermoplastic resins. The cores are resistant to transformer oils and will not come apart when operated at elevated temperatures. The resin maintains its hardness over a relatively wide range of temperatures. Durometer measurements of the hardness of a given castor oil-maleate-styrene resinous copolymer shows an exceptionally flat hardness temperature curve. In one case, the durometer measurement at 28° C. was 80 and at 100° C. the value was 70. This relatively small change of hardness with temperature is a particularly important feature for many applications.

The resinous compositions are suitable for many applications in which members are to be completely impregnated in a resinous material. The compositions may be employed as potting compounds for protecting and insulating electrical windings, cores and other members from the elements.

Referring to Fig. 6 of the drawing, there is illustrated a hermetically encased transformer 50 capable of use under the most adverse conditions. The transformer comprises a plurality of cores 10 produced as disclosed herein, associated with a winding 52, all mounted on a base 54. The electrical members are disposed within a casing 56 of metal, porcelain, or other suitable material. A cover 58 attached to the casing 56 is provided with insulating bushings 62 through which the conductor 60 from the electrical coil 52 passes. The casing is filled with the thermoset resin 64 comprising a solution of the unsaturated acid half ester in a liquid polymerizable monomer introduced as a liquid into the casing 56 and polymerized by means of heat and catalyst to a solid state. The electrical properties of the composition 64 will provide excellent insulation. The heat and moisture resistance of the resin 64 will enable the electrical members to operate indefinitely under any condition of service normally encountered.

An economical method of employing the resin composition as a filler for electrical apparatus is to incorporate an inorganic filler up to 60% of the weight of the resin. Examples of suitable fillers are quartz, sand, feldspar, glass, asbestos fibers, ceramic particles and the like. One method which has been found satisfactory in incorporating the inorganic filler is to coat the inorganic filler with a polymerizing catalyst, such as benzoyl peroxide, so as to produce a film thereof on the surface of the inorganic particles. When it is desired to fill the casing of apparatus, the liquid composition is poured in first and the catalyst coated inorganic filler is then mixed in slowly until the casing is full. The apparatus is then placed in an oven and heated for a period of time sufficient to cause the resin to completely solidify.

The compositions of the present invention have found extensive use in encapsulating electrical members. Application of the compositions for encapsulating electrical members is illustrated in Figs. 7 and 8.

Referring to Fig. 7, the impregnating tank 70 composed of a casing 72 and provided with a conduit 74 for introducing and removing the fluid compositions and a conduit 76 for evacuating the casing, contains the solventless composition 78 disclosed herein. A transformer 80 composed of a wound core 10 and a coil 82 has been initially previously treated by dipping into a highly viscous type of the composition, usually containing mica or other filler, having a viscosity above 20,000 centipoises, whereby to provide a surface coating 84 in the shape of a cup or shield about the major portion of the surface thereof, leaving only a small portion of the upper part uncovered. The coating 84 has been heat treated to an insoluble state. When introduced into the impregnating tank 70, the transformer 80 is placed so that the outer covering 84 forms a fluid retaining cup thereabout disposed so as to be open at the top. After the tank has been evacuated through the conduit 76 for about fifteen minutes to a pressure of one inch of mercury or less, the fluid composition is introduced through the conduit 74. Positive pressure may be applied to the resin composition, for example eighty pounds per square inch for one hour, in order to thoroughly impregnate all the interstices of the transformer 80. Thereafter, the composition 78 may be drained through the conduit 74 and the impregnated transformer 80 removed and heat treated. The composition will have completely filled the transformer up to the upper level of the coating 84, with considerable quantities of the impregnating composition present in portions above that level due to capillary action.

After heat treatment, whereby the composition 78 present in the transformer has been fully cured, the transformer 80 is turned upside down and dipped into a quantity of the composition of a relatively high viscosity of the order of 20,000 to 400,000 centipoises. This provides for completion of the outer shield or coating about the transformer 80 and insulation of interstices of a relatively large size that did not retain some of the composition 78. Upon heat treatment to completely cure this last applied coating, the transformer will have the appearance shown in Fig. 8 of the drawing, wherein the two surface coatings 84 and 86 form a complete envelope about the transformer and thereby encapsulate it.

Transformers, such as shown in Fig. 8 of the drawing, have been produced in large quantities for many uses. They have been found satisfactory when used under the most extreme conditions of temperature and atmospheric pressures. The high degree of moisture resistance of the thermoset resins of the present invention has enabled the transformers to operate under severe tropical conditions as well as at high altitudes. In one case, a transformer similar to that shown in Fig. 8 was immersed in water for over six months and operated during all this time.

The resin prepared from the half ester of castor oil and an unsaturated dibasic acid, and a polymerizable liquid monomer having the radical $H_2C=C<$ has been satisfactory when in contact with refined petroleum oil. Such refined petroleum oil is a common liquid dielectric in electrical apparatus. In cases where the magnetic cores or other members are to be employed in contact with more active dielectrics, for example the halogenated hydrocarbons, the resin should be somewhat modified to contribute increased resistance to the solvent action of these latter dialectrics.

Resinous additives conferring increased solvent resistance are prepared by condensing a polyhydric alcohol with a saturated dibasic acid, part of which may be replaced by an olefinic dibasic acid, and the ratio of saturated to olefinic acids may be as much as 1:3. Preferably, the additive is prepared by reacting approximately equimolar quantities of polyhydric alcohol and dibasic acid.

A satisfactory proportion of additive is two-thirds mol adipic acid, 1 mol maleic anhydride and 1⅔ mols propylene glycol. Condensation or reaction is effected by heating the mixture of polyhydric alcohol and dibasic acid for two hours at 200° C. to produce an amber colored resin. Another combination was prepared by reacting 75 parts by weight of adipic acid, 75 parts maleic anhydride and 135.4 parts di-ethylene glycol. This was reacted to a viscous resin and dissolved in 25% of its weight of monostyrene. The viscosity of this solution was such that it could be readily admixed with the castor oil-maleate-styrene solutions of Examples II and III.

The resin additive produced by condensing the polyhydric alcohol with the dibasic acid may be put in solution by employing a polymerizable liquid monomer having the radical $H_2C=C<$ such, for example, as monostyrene. The polyhydric alcohol-dibasic acid resin is most compatible with the castor-oil-maleic anhydride product when about 50% of the dibasic acid has from 6 to 10 carbon atoms in the chain.

The castor oil half ester and the additive solutions may be admixed in substantially equal parts, for example, 100 parts of a castor oil-maleate and monostyrene composition and 100 parts of a adipic acid-maleic acid-propylene glycol resin and monostyrene composition may be combined to produce a mixture which when polymerized exhibits a high degree of resistance to the solvent action of chlorinated hydrocarbons. As little as 20 parts of the polyhydric alcohol and dibasic organic acid may be added to the basic solution in order to confer improved resistance to the solvent action of various dielectrics. From 20 to 330 parts of vinyl monomer such as monostyrene are required to dissolve a mixture composed of 100 parts each of the castor oil-maleate and the polyhydric alcohol-dibasic acid reaction product.

In tests made on magnetic cores, particularly cores embodying preferentially oriented silicon steel, it has been discovered that the magnetic steel is extremely susceptible to strains such as may be set up when almost any impregnating resin hardens. For example, the losses of an unimpregnated wound core for a given flux density and frequency may be approximately 10% lower than the losses for the same core impregnated with a given castor oil-maleate-monostyrene copolymer due to the stains set up by the resin on curing.

In order to reduce the losses in magnetic materials sensitive to strains produced by the polymerization of the resin impregnant, the unsaturated acid half ester-monomer composition may be modified to produce a tougher resin which when applied to laminations of magnetic material results in lower losses. A suitable modifying resin addition is produced by reacting tung oil or oiticica oil with an olefinic dicarboxylic acid. The olefinic dibasic acid, for example, maleic anhydride, may be reacted with tung oil at temperatures from 150 to 200° C. for a period of several hours. A thick viscous liquid is generally produced by the reaction. The unsaturated tung oil-dibasic acid product may be added in quantities ranging from 2 to 4 times the amount of castor oil-dibasic acid-vinyl monomer in order to produce a satisfactory low loss resinous binder. By impregnating cores with a resin comprising 100 parts of castor oil-maleate, 30 parts of styrene and 390 parts of tung oil-maleate cores losses have been reduced to one-fourth of the loss increase when castor oil-maleate dissolved in styrene is employed alone as the core bonding agent.

The tung oil-dibasic acid additions to the castor oil reaction product produces resins which are much tougher as well as slightly softer than the castor oil-dibasic acid resins alone.

A further characteristic of the castor oil-unsaturated dicarboxylic acid-styrene compositions has been their sound and noise absorbing properties. A core prepared with these resins as shown in Figs. 3 to 5, gives a substantially dead sound similar to a piece of lead when struck with a hammer. Thermoplastic resins, for example, when applied to the wound cores and baked hard to produce good electrical insulation and adequate bonding will ring like a bell. The latter core will be noisier in service due to magnetostriction than the core bonded with the resin of this invention which latter will tend to absorb magnetostrictive noises and act like a damped vibrating system. The castor oil-dibasic acid thermosetting resin alone or modified as indicated above will greatly diminish the noisiness of the cores.

In preparing solutions in a polymerizable monomer of the castor oil half ester resin, both the tung oil-dibasic acid and the polyhydric alcohol-dibasic acid reaction products may be simultaneously embodied in the composition in order to achieve high solvent resistance as well as a high degree of toughness.

Since the castor oil and the olefinic dibasic acids reacted to the acid half esters have one carboxyl group per ester linkage free whereby the product is acid in nature, it may be desirable to esterify the free carboxyl group and thus completely neutralize the carboxyl groups. For example, methyl groups and other neutral aliphatic hydrocarbon groups may replace the acid hydrogen in the free carboxyl group by esterification with an appropriate alcohol such as ethanol, methanol or propanol. The full ester derived from the acid ester dibasic acid-castor oil and a short carbon chain monohydric alcohol polymerizes more slowly with monostyrene for example than the acid half ester containing free carboxyl groups, and due allowance should be made for this in polymerization.

The solventless compositions disclosed in this invention may be employed for other purposes than impregnating magnetic cores. Materials and members of all types may be bonded therewith—mica flakes, glass cloth, paper, etc., may be combined to reduce laminated or molded products. The resin may be cast into plates or other bodies and used for any desired purpose.

Since certain changes may be made in the above article and different embodiments of the invention can be made without departing from the scope thereof, it is intended that all matter contained in the above description or shown in the accompanying drawing shall be interpreted as illustrative and not in a limiting sense.

I claim as my invention:

1. A composition comprising, in combination, from 10 to 186 parts by weight of liquid monostyrene and 100 parts by weight of the acid half ester reaction product of from 2 to 4 parts by weight of castor oil and approximately one part by weight of an anhydride of an olefinic alpha, beta dicarboxylic acid.

2. A composition comprising, in combination, from 10 to 186 parts by weight of liquid monostyrene and 100 parts by weight of the acid half ester reaction product of from 100 parts by weight of castor oil and approximately from 3 to 30 parts by weight of an anhydride of an olefinic alpha, beta dicarboxylic acid.

3. A composition comprising, in combination, from 10 to 186 parts by weight of a liquid polymerizable monomer having a single group $H_2C=C<$ and 100 parts by weight of the acid half ester reaction product of 100 parts by weight of castor oil and approximately from 3 to 30 parts by weight of an acidic compound selected from the group consisting of olefinic alpha, beta dicarboxylic acids and anhydrides thereof.

4. A composition comprising, in combination, from 10 to 186 parts by weight of liquid monostyrene and 100 parts by weight of the acid half ester reaction product of 100 parts by weight of castor oil and from about 3 to 30 parts by weight of maleic anhydride.

5. A liquid composition comprising, in combination, (a) 300 to 400 parts of the reaction product of tung oil and an unsaturated alpha, beta dicarboxylic acid, (b) 100 parts of the reaction product of from 2 to 4 parts of castor oil and about 1 part of an unsaturated alpha, beta dicarboxylic acid and (c) from 10 to 186 parts of monostyrene to provide a reactive solvent for the reaction products, the liquid composition capable of completely polymerizing to an electrically insulating solid having low losses when applied to transformer laminations as a bonding and insulating agent.

6. A liquid composition comprising, in combination, (a) 100 parts by weight of the reaction product of from 2 to 4 parts of castor oil and approximately one part of an unsaturated alpha, beta dicarboxylic acid, (b) 20 to 330 parts of monostyrene to provide a reacting solvent, (c) 300 to 400 parts of the reaction product of one hundred parts of tung oil and from twenty to fifty parts of an unsaturated alpha, beta dicarboxylic acid to provide for toughness and (d) 20 to 100 parts of the reaction product of substantially equimolar quantities of a polyhydric alcohol and a mixture of saturated and unsaturated dicarboxylic acids the proportion of the saturated acid being not less than 25% of the mixture to provide for resistance to the solvent action of fluid dielectrics, at least 50% of the dicarboxylic acid having from 6 to 10 carbon atoms in a chain, the liquid composition capable of substantially completely polymerizing into a solid resinous body providing good electrical insulation.

7. A liquid composition comprising, in combination, (a) from 300 to 400 parts by weight of the reaction product of tung oil and an olefinic alpha, beta dicarboxylic acid, (b) 100 parts by weight of the acid half ester of 100 parts by weight of castor oil and from 3 to 30 parts by weight of an olefinic alpha, beta dicarboxylic acid, and (c) from 10 to 186 parts by weight of a polymerizable liquid monomer having a single group $H_2C=C<$.

8. A liquid composition comprising, in combination, a solution composed of from 10 to 186 parts by weight of a polymerizable liquid monomer having a single group $H_2C=C<$ and 100 parts by weight of the acid half ester derived by reacting a polyhydric alcohol ester of ricinoleic acid and sufficient of an olefinic alpha, beta dicarboxylic acid to provide a molecule of olefinic acid for at least one ricinoleic acid radical in each molecule of the ester and not exceeding a molecule of the olefinic acid for each ricinoleic acid radical in each molecule of the ester.

9. A liquid composition comprising, in combination, a solution composed of from 10 to 186 parts by weight of a polymerizable liquid monomer having a single group $H_2C=C<$ and 100 parts by weight of the full ester composed of the acid half ester derived by reacting a polyhydric alcohol ester of ricinoleic acid and sufficient of an olefinic alpha, beta dicarboxylic acid to provide a molecule of olefinic acid for at least one ricinoleic acid radical in each molecule of the ester and not exceeding a molecule of the olefinic acid for each ricinoleic acid radical in each molecule of the ester, and the other carboxyl group of the half ester being esterified with an aliphatic hydrocarbon monohydric alcohol having no other reactive group than the hydroxyl group.

10. The thermoset resinous composition derived by polymerizing from 10 to 186 parts by weight of a liquid polymerizable monomer having the group $H_2C=C<$ and 100 parts by weight of the acid half ester reaction product of 100 parts by weight of castor oil and approximately from 3 to 30 parts by weight of an anhydride of an olefinic alpha, beta dicarboxylic acid.

11. The thermoset resinous composition derived by polymerizing from 10 to 186 parts by weight of a liquid monostyrene and 100 parts by weight of the acid half ester reaction product of 100 parts by weight of castor oil and from about 3 to 30 parts by weight of maleic anhydride.

12. In electrical apparatus, an electrical conductor and a thermoset insulating binder applied thereto, the binder composed of the polymer of from 10 to 186 parts by weight of a liquid polymerizable monomer having a single group $H_2C=C<$ and 100 parts by weight of the acid half ester reaction product of 100 parts by weight of castor oil and approximately from 3 to 30 parts by weight of an anhydride of an olefinic alpha, beta dicarboxylic acid, the binder being a solid substantially free from cavities to provide efficient heat removal from the electrical conductor.

13. In electrical apparatus, an electrical conductor and a thermoset insulating binder applied thereto, the binder composed of the polymer of from 10 to 186 parts by weight of liquid monostyrene and 100 parts by weight of the acid half ester reaction product of 100 parts by weight of castor oil and from about 3 to 30 parts by weight of maleic anhydride.

NEWTON C. FOSTER.

REFERENCES CITED

The following references are of record in the file of this patent:

UNITED STATES PATENTS

| Number | Name | Date |
|---|---|---|
| 2,105,567 | Webb | Jan. 18, 1938 |
| 2,116,318 | Miles | May 3, 1938 |
| 2,160,204 | Gibbons | May 30, 1939 |
| 2,293,951 | Seastone et al. | Aug. 25, 1942 |
| 2,312,024 | Brown | Feb. 23, 1943 |
| 2,319,537 | Delmonte | May 18, 1943 |
| 2,372,074 | Ford | Mar. 20, 1945 |
| 2,376,706 | Lum | May 22, 1945 |
| 2,385,460 | Omansky | Sept. 25, 1945 |
| 2,392,710 | Wakeford et al. | Jan. 8, 1946 |
| 2,394,440 | Gordon | Feb. 5, 1946 |
| 2,414,525 | Hill et al. | Jan. 21, 1947 |
| 2,416,143 | Berberich | Feb. 18, 1947 |
| 2,423,869 | Blessing | July 15, 1947 |
| 2,439,953 | Swiss et al. | Apr. 20, 1948 |